United States Patent
Ikehara et al.

(10) Patent No.: US 10,467,901 B2
(45) Date of Patent: Nov. 5, 2019

(54) WARNING DEVICE AND STREET LIGHT SYSTEM

(71) Applicant: PANASONIC INTELLECTUAL PROPERTY MANAGEMENT CO., LTD., Osaka (JP)

(72) Inventors: Masaaki Ikehara, Osaka (JP); Kentaro Yamauchi, Hyogo (JP); Kazuhiro Hatta, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/714,624

(22) Filed: Sep. 25, 2017

(65) Prior Publication Data
US 2018/0090010 A1 Mar. 29, 2018

(30) Foreign Application Priority Data

Sep. 29, 2016 (JP) .................................. 2016-191772

(51) Int. Cl.
*G08G 1/095* (2006.01)
*G08G 1/16* (2006.01)
(Continued)

(52) U.S. Cl.
CPC ......... *G08G 1/166* (2013.01); *G06K 9/00335* (2013.01); *G06K 9/00771* (2013.01);
(Continued)

(58) Field of Classification Search
CPC . G08G 1/166; G08G 1/095; F21S 2/00; F21S 8/086
USPC .......................................................... 340/907
See application file for complete search history.

(56) References Cited

U.S. PATENT DOCUMENTS

| 5,760,708 A * | 6/1998 | Seith ...................... B60Q 1/525 |
| | | 180/169 |
| 6,292,109 B1 * | 9/2001 | Murano ................. G08G 1/164 |
| | | 340/902 |

(Continued)

FOREIGN PATENT DOCUMENTS

| JP | 04-073300 U | 6/1992 |
| JP | 07-105500 A | 4/1995 |

(Continued)

OTHER PUBLICATIONS

Machine translation of KR 101338124 B1.*
Machine translation of JP 2012014556 A.*

*Primary Examiner* — Steven Lim
*Assistant Examiner* — Kam Wan Ma
(74) *Attorney, Agent, or Firm* — McDermott Will & Emery LLP

(57) ABSTRACT

A warning device includes: a sensor which is attachable to a supporting member and measures a distance, the supporting member being fixedly installed; and a notifier which performs notification using predetermined output. The sensor measures at least one of sensor-object distances and a moving object distance, the sensor-object distances being distances between the sensor and each of at least two moving objects which are approaching to each other, the moving object distance being a distance between the at least two moving objects which are approaching to each other, and the notifier performs the notification by varying a manner of the predetermined output according to the at least one of the sensor object distances and the moving object distance which are measured by the sensor.

20 Claims, 12 Drawing Sheets

(51) Int. Cl.
*G06K 9/00* (2006.01)
*F21W 131/103* (2006.01)
*F21S 8/08* (2006.01)
*F21S 2/00* (2016.01)

(52) U.S. Cl.
CPC ............ *G08G 1/095* (2013.01); *G08G 1/164* (2013.01); *F21S 2/00* (2013.01); *F21S 8/086* (2013.01); *F21W 2131/103* (2013.01)

(56) References Cited

U.S. PATENT DOCUMENTS

| | | | | |
|---|---|---|---|---|
| 7,133,661 | B2 * | 11/2006 | Hatae | G08B 13/19645 |
| | | | | 455/404.1 |
| 7,190,283 | B1 * | 3/2007 | Varian | G08G 1/164 |
| | | | | 340/436 |
| 8,723,680 | B1 * | 5/2014 | Baker | G08B 5/38 |
| | | | | 340/539.1 |
| 9,523,473 | B2 * | 12/2016 | Ackermann | B60Q 1/085 |
| 2015/0123817 | A1 * | 5/2015 | Almalki | F03D 9/00 |
| | | | | 340/907 |
| 2015/0262482 | A1 * | 9/2015 | Kosatka-Pioro | |
| | | | | G08G 1/096716 |
| | | | | 340/932 |
| 2017/0061761 | A1 * | 3/2017 | Kolla | G08B 21/0261 |
| 2017/0327035 | A1 * | 11/2017 | Keiser | B60Q 9/008 |

FOREIGN PATENT DOCUMENTS

| | | | |
|---|---|---|---|
| JP | 11-110688 A | | 4/1999 |
| JP | 2002-092797 A | | 3/2002 |
| JP | 2012014556 A | * | 1/2012 |
| JP | 2013-200866 A | | 10/2013 |
| KR | 101338124 B1 | * | 12/2013 |

* cited by examiner

WARNING DEVICE AND STREET LIGHT SYSTEM

CROSS REFERENCE TO RELATED APPLICATION

This application claims the benefit of priority of Japanese Patent Application Number 2016-191772 filed on Sep. 29, 2016, the entire content of which is hereby incorporated by reference.

BACKGROUND

1. Technical Field

The present disclosure relates to a warning device and a street light system.

2. Description of the Related Art

A warning device which gives an alarm to one of two moving objects which are approaching to each other for preventing collision between the two moving objects is conventionally known. As a warning device of such a type, for example, Japanese Unexamined Patent Application Publication No. 2013-200866 discloses a rushing-out alarm which predicts rushing out of a person onto a road and gives an alarm to a driver of a car. In this manner, it is possible to prevent collision between the person and the car.

SUMMARY

However, with conventional warning devices, it is difficult for two moving objects which are approaching to each other to notice that one of the two moving objects is approaching to the other.

The present disclosure has been conceived to solve such a problem, and an object of the present disclosure is to provide a warning device and a street light system which are capable of causing two moving objects which are approaching to each other to be easily aware that one of the two moving objects is approaching to the other.

In order to achieve the above-described object, a warning device according to an aspect of the present disclosure includes: a sensor which is attachable to a supporting member and measures a distance, the supporting member being fixedly installed; and a notifier which performs notification using predetermined output. The sensor measures at least one of sensor-object distances and a moving object distance, the sensor-object distances being distances between the sensor and each of at least two moving objects which are approaching to each other, the moving object distance being a distance between the at least two moving objects which are approaching to each other, and the notifier performs the notification by varying a manner of the predetermined output according to the at least one of the sensor-object distances and the moving object distance which are measured by the sensor.

In addition, a street light system according to an aspect of the present disclosure includes: a plurality of street lights installed along a street; and a plurality of warning devices attached to the plurality of street lights. Each of the plurality of warning devices includes: a sensor which measures a distance to an object; and a notifier which performs notification using predetermined output, the sensor measures at least one of sensor-object distances and a moving object distance, the sensor-object distances being distances between the sensor and each of at least two moving objects which are approaching to each other, the moving object distance being a distance between the at least two moving objects which are approaching to each other, and the notifier performs the notification by varying a manner of the predetermined output according to the at least one of the sensor-object distances and the moving object distance which are measured by the sensor.

According to the present disclosure, it is possible to cause two moving objects which are approaching to each other to be easily aware that one of the two moving objects is approaching to the other.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

Hereinafter, embodiments of the present disclosure are described with reference to the drawings. It should be noted that the subsequently-described embodiments each show a specific preferred example of the present disclosure. Furthermore, among the structural components in the following embodiments, components not recited in the independent claims which indicate the broadest concepts of the present disclosure are described as arbitrary structural components.

In addition, each of the diagrams is a schematic diagram and thus is not necessarily strictly illustrated. In each of the diagrams, substantially the same structural components are assigned with the same reference signs, and redundant descriptions will be omitted or simplified.

Embodiment 1

(Configuration)

Figure 1:
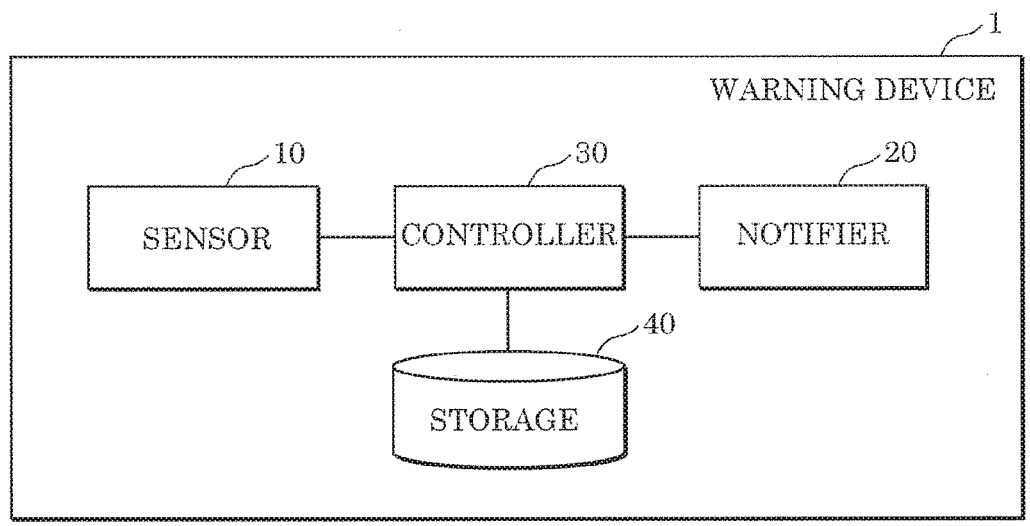
FIG. 1 is a function block diagram which illustrates a configuration of the warning device according to Embodiment 1.
Figure 2:
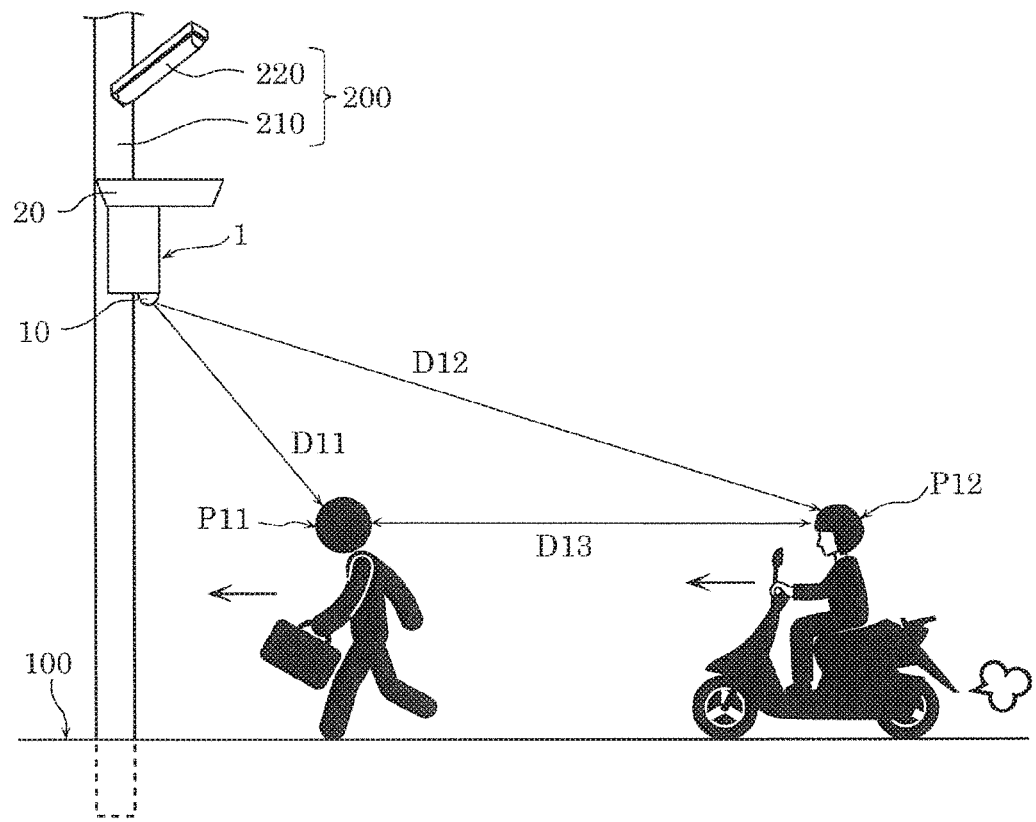
FIG. 2 is a diagram which illustrates an installation example of the warning device according to Embodiment 1.

First, a configuration of warning device 1 according to Embodiment 1 shall be described with reference to FIG. 1 and FIG. 2. FIG. 1 is a function block diagram which illustrates a configuration of warning device 1 according to Embodiment 1. FIG. 2 is a diagram which illustrates an installation example of warning device 1 according to Embodiment 1.

Warning device 1 according to the present embodiment is a device which performs predetermined notification to two or more moving objects (notification target) which are approaching to each other, and includes sensor 10, notifier 20, controller 30, and storage 40, as illustrated in FIG. 1. The two or more moving objects which are approaching to each other include a short-distance object and a long-distance object. The short-distance object is present at a position close to sensor 10. The long-distance object is present at a position away from sensor 10.

According to the present embodiment, only two approaching moving objects are present as illustrated in FIG. 2. One of the approaching moving objects is pedestrian P11 who walks on road 100, and the other is two-wheel vehicle P12 which runs on road 100. As an example, a walking speed of pedestrian P11 is approximately 2 Km/h or higher and 5 Km/h or lower, and a running speed of two-wheel vehicle P12 is approximately 10 Km/h or higher. According to the present embodiment, among pedestrian P11 and two-wheel vehicle P12, one which is closer to sensor 10 is pedestrian P11, and the other which is farther from sensor 10 is two-wheel vehicle P12. Accordingly, pedestrian P11 is the short-distance object, and two-wheel vehicle P12 is the long-distance object. Two-wheel vehicle P12 is, for example, a motorbike, a bicycle, or the like. Road 100 is an example of a street, and may be any road as long as pedestrian P11 and two-wheel vehicle P12 can pass.

As illustrated in FIG. 2, warning device 1 is attached to street light 200 installed along road 100, for example. Street light 200 includes support column 210 which is a supporting member and has a pillar shape, and lighting device 220. According to the present embodiment, warning device 1 is supplied with power from street light 200 via support column 210.

Support column 210 is installed along, for example, road 100 and fixed. According to the present embodiment, support column 210 (supporting member) is fixed in a state in which a portion of support column 210 is embedded in the ground. Lighting device 220 is attached to support column 210, and illuminates an area around warning device 1. More specifically, lighting device 220 illuminates a road surface (ground surface) of road 100 and a space area above the road surface. Lighting device 220 uses, for example, a light emitting diode (LED) as a light source, and emits white light as illumination light. It should be noted that, the light source of lighting device 220 is not limited to the LED, and may be a fluorescent lamp, a metal halide lamp, a sodium-vapor lamp, a halogen lamp, a xenon lamp, a neon lamp, or the like, or may be a solid-state light-emitting element such as an organic EL, a semiconductor laser, or the like.

In warning device 1, sensor 10 has a function of measuring a distance to at least an object (target). Sensor 10 includes a Doppler sensor, for example. The Doppler sensor detects a motion of an object by emitting radio waves (microwaves), detecting a frequency of a radio wave reflected by the object and a frequency of the radio wave emitted, and comparing the frequencies. Use of the Doppler sensor enables measuring of a speed of a moving object and a distance to the moving object in a non-contact manner.

According to the present embodiment, sensor 10 measures sensor-object distances which are distances between sensor 10 and each of the at least two moving objects which are approaching to each other. More specifically, sensor 10 measures, as the sensor-object distances, first distance D11 between pedestrian P11 and sensor 10, and second distance D12 between two-wheel vehicle P12 and sensor 10.

In addition, sensor 10 measures a moving object distance which is a distance between the at least two moving objects which are approaching to each other. More specifically, sensor 10 measures, as the moving object distance, third distance D13 between pedestrian P11 and two-wheel vehicle P12.

In addition, sensor 10 is capable of measuring the speed of each of the two moving objects which are approaching to each other. More specifically, sensor 10 is capable of measuring the speed of each of pedestrian P11 and two-wheel vehicle P12.

In addition, sensor 10 is capable of detecting an acceleration of each of the two moving objects which are approaching to each other. More specifically, sensor 10 is capable of detecting an acceleration of each of pedestrian P11 and two-wheel vehicle P12. For example, acceleration of pedestrian P11 or two-wheel vehicle P12 is calculated by computing a result of detection performed by sensor 10, and thereby it is possible to detect an acceleration by regarding, as an acceleration, acceleration of each of pedestrian P11 and two-wheel vehicle P12 which is greater than or equal to a predetermined value.

In addition, sensor 10 may include a plurality of Doppler sensors for measuring, for each of pedestrian P11 and two-wheel vehicle P12, a distance to sensor 10 and a speed. Furthermore, in addition to the Doppler sensor, sensor 10 may include a processor, a microcomputer, etc., for computing a result of detection performed by the Doppler sensor. This computation may be performed not by sensor 10 but by controller 30. In other words, part of the processes performed by sensor 10 may be performed by controller 30.

It should be noted that, although it is described that sensor 10 includes a Doppler sensor according to the present embodiment, the configuration of sensor 10 is not limited to this example. For example, sensor 10 may measure, for each of pedestrian P11 and two-wheel vehicle P12, a distance to sensor 10, a speed, etc., by using a ranging sensor such as an ultrasonic ranging sensor, an infrared ranging sensor, optical ranging sensor, and a distance image sensor, instead of the Doppler sensor. In addition, sensor 10 may include a combination of two or more of these types of sensors including the Doppler sensor. Alternatively, sensor 10 may include an imaging device such as a camera and perform image processing such as object detection on moving pictures captured by the imaging device, thereby measuring a distance to sensor 10, a speed, etc., for each of pedestrian P11 and two-wheel vehicle P12.

Sensor 10 which has such a configuration is attachable to support column 210 (supporting member) that is fixedly installed. In other words, although sensor 10 has a configuration that is attachable to support column 210, sensor 10 need not be attached to support column 210. According to the present embodiment, sensor 10 is attached to support column 210. In other words, sensor 10 is fixed to support column 210.

The following describes notifier 20. Notifier 20 has a function of performing notification using predetermined output. More specifically, notifier 20 performs, to at least one of the two or more moving objects, notification indicating that another of the two or more moving objects is approaching to the one of the two or more moving objects, using predetermined output. In other words, notifier 20 serves as an alarm which alarms two or more moving objects which are approaching to each other.

In FIG. 2, for example, notifier 20 performs notification to at least pedestrian P11. According to the present embodiment, notifier 20 performs notification to both of pedestrian P11 and two-wheel vehicle P12. In this manner, when a driver of two-wheel vehicle P12 is trying to commit snatching, it is possible to alarm pedestrian P11 with notification performed by notifier 20, and to startle the driver of t eel vehicle P12 with the notification performed by notifier 20.

It should be noted that notifier 20 may avoid performing of the notification when the at least two moving objects include three or more moving objects. In other words, notifier 20 performs notification when two moving objects are present. In FIG. 2, for example, notifier 20 performs notification to only pedestrian P11 and two-wheel vehicle P12.

The predetermined output used when notifier 20 performs notification is output using light. In other words, notifier 20 performs notification to moving objects by outputting light. In this case, notifier 20 includes, for example, a light source such as an LED light source, and performs notification using light emitted by the light source. More specifically, notifier 20 performs notification such that light is emitted to the road surface (ground surface) of road 100. It should be noted that the light source may have a function of controlling brightness and a function of controlling color so as to vary a brightness level and a light color (chromaticity), or may have a flash function so as to flash. The type of the light source of notifier 20 is not limited to the LED light source, as with lighting device 220 of street light 200.

Notifier 20 performs notification by varying a manner of the predetermined output according to the sensor-object distances or the moving object distance measured by sensor 10. More specifically, notifier 20 performs notification by varying a manner of light according to first distance D11 (sensor-object distance) between pedestrian P11 and sensor 10, and second distance D12 (sensor object distance) between two-wheel vehicle P12 and sensor 10, or performs notification by varying a manner of light according to third distance D13 (moving object distance) between pedestrian P11 yeah and two-wheel vehicle P12. This enables pedestrian P11 to sense that some abnormality might be occurring around pedestrian P11. For instance, pedestrian P11 easily notices that two-wheel vehicle P12 is approaching to pedestrian P11.

The variation in the manner of light can be implemented by, for example, varying a brightness level or a light color of light emitted from notifier 20, varying blinking or flash of light emitted from notifier 20, or varying distribution of light emitted from notifier 20. In addition, although the light emitted from notifier 20 is, for example, white light, the light may be yellow light which calls attention, red light which indicates danger, etc.

As an example, notifier 20 performs notification which increases an output amount of the predetermined output (increases the brightness level of light, for example), or increases a rate of variation in the predetermined output (increase a blinking rate of light, for example), with decreasing difference (D12−D11) between second distance D12 of two-wheel vehicle P12 to sensor 10 and first distance D11 of pedestrian to sensor 10, which are measured by sensor 10. In this manner, pedestrian P11 more easily notices the notification performed by notifier 20, and be more easily aware that a dangerous moving object is gradually approaching to pedestrian P11.

In addition, notifier 20 may perform notification according to a variation in the sensor-object distances or the moving object distance measured by sensor 10. More specifically, notifier 20 may perform notification according to a variation per unit time in the sensor-object distances or the moving object distance measured by sensor 10. In other words, notifier 20 may perform notification according to a speed of pedestrian P11 or two-wheel vehicle P12.

As an example, notifier 20 performs notification when, among two moving objects, the speed of the long-distance object (two-wheel vehicle P12) is higher than the speed of the short-distance object (pedestrian P11). In other words, notifier 20 performs notification when the long-distance object (two-wheel vehicle P12) is approaching to the short-distance object (pedestrian P11). In this manner, it is possible to cause pedestrian P11 to be aware that two-wheel vehicle P12 is approaching to pedestrian P11.

In this case, notifier 20 may further perform notification according to presence or absence of an acceleration of the long-distance object (two-wheel vehicle P12). For example, notifier 20 may separately perform notification when sensor 10 detects an acceleration of the long-distance object (two-wheel vehicle P12). In this manner, pedestrian P11 easily notices that two-wheel vehicle P12 is abruptly accelerated and approaching to pedestrian P11.

Notifier 20 having such a configuration as described above may be configured integrally with sensor 10 or may be configured separately from sensor 10. When notifier 20 is integrally configured with sensor 10, notifier 20 is attached to support column 210 together with sensor 10. In addition, notification by notifier 20 may be performed while lighting device 220 of street light 200 is on (during night-time), or may be performed while lighting device 220 is off (during daytime).

It should be noted that, although notifier 20 performs notification by outputting light (optical output) according to the present embodiment, the output is not limited to this example. For example, when notifier 20 includes a speaker, notifier 20 may perform notification by outputting a sound (sound output) such as a machine sound (a beep sound, etc.), music (melody, etc.), a human voice, etc. In this case, notifier 20 performs notification by varying a manner of the sound (loudness of the sound, etc.) according to the sensor-object distances or the moving object distance measured by sensor 10. Alternatively, notifier 20 may perform notification by outputting not light or a sound but an aroma (aroma output). In addition, when the moving object (pedestrian P11, two-wheel vehicle P12) holds a mobile terminal such as a smartphone, notifier 20 may perform notification to the mobile terminal by varying a manner of display, instead of light, a sound, or an aroma, or together with light, a sound, or an aroma. In other words, notifier 20 may perform notification using a display output (image output). In this case, as a display means, a signboard or the like including a display screen may be disposed under lighting device 220, instead of the mobile terminal or together with the mobile terminal. As described above, the predetermined output performed for notification by notifier 20 is not limited to light, and may be carried out using other stimuli such as a sound, an aroma, an image, etc. It should be noted that the same holds true for Embodiments 2 and 3, and modification examples described blow.

The following describes controller 30. Controller 30 has a control function for performing various controls related to warning device 1. Controller 30, for example, controls notifier 20 for varying a manner of the predetermined output performed by notifier 20. In other words, controller 30 outputs, to notifier 20, a control signal for causing notifier 20 to perform notification by varying a manner of the predetermined output, on the basis of a measurement result of sensor 10.

According to the present embodiment, notifier 20 includes a light source and performs notification using light as the predetermined output, and thus controller 30 controls a light-emission state of the light source of notifier 20 so as to vary the manner of light. In other words, controller 30 controls the light source of notifier 20 for varying the brightness or chromaticity (a light color or a color temperature) of light emitted by the light source of notifier 20, causing the light to blink or flash, etc. It should be noted that, controller 30 is implemented by, for example, a processor, a microcomputer, a dedicated circuit, etc.

The following describes storage 40. Storage 40 stores the measurement result of sensor 10, information related to the notification performed by notifier 20, etc. For example, storage 40 stores the sensor-object distances and the moving object distance of approaching moving objects (pedestrian P11, two-wheel vehicle P12) as the measurement result of sensor 10, or stores speeds of the approaching moving objects (pedestrian P11, two-wheel vehicle P12). In addition, storage 40 stores details of a notification (a manner of output), a start time or an end time of a notification, the number of times of notification, etc., as the information related to the notification performed by notifier 20.

It should be noted that storage 40 may store a control program or the like to be executed by controller 30. Storage 40 is, for example, implemented by a semiconductor memory, etc.

In warning device 1, sensor 10, notifier 20, controller 30, and storage 40 are housed in a metal casing or a resin casing. The casing is attached to support column 210 of street light 200 by an attaching member having a ring shape, for example. In this manner, warning device 1 is fixed to support column 210.

Operation Example

Figure 3:
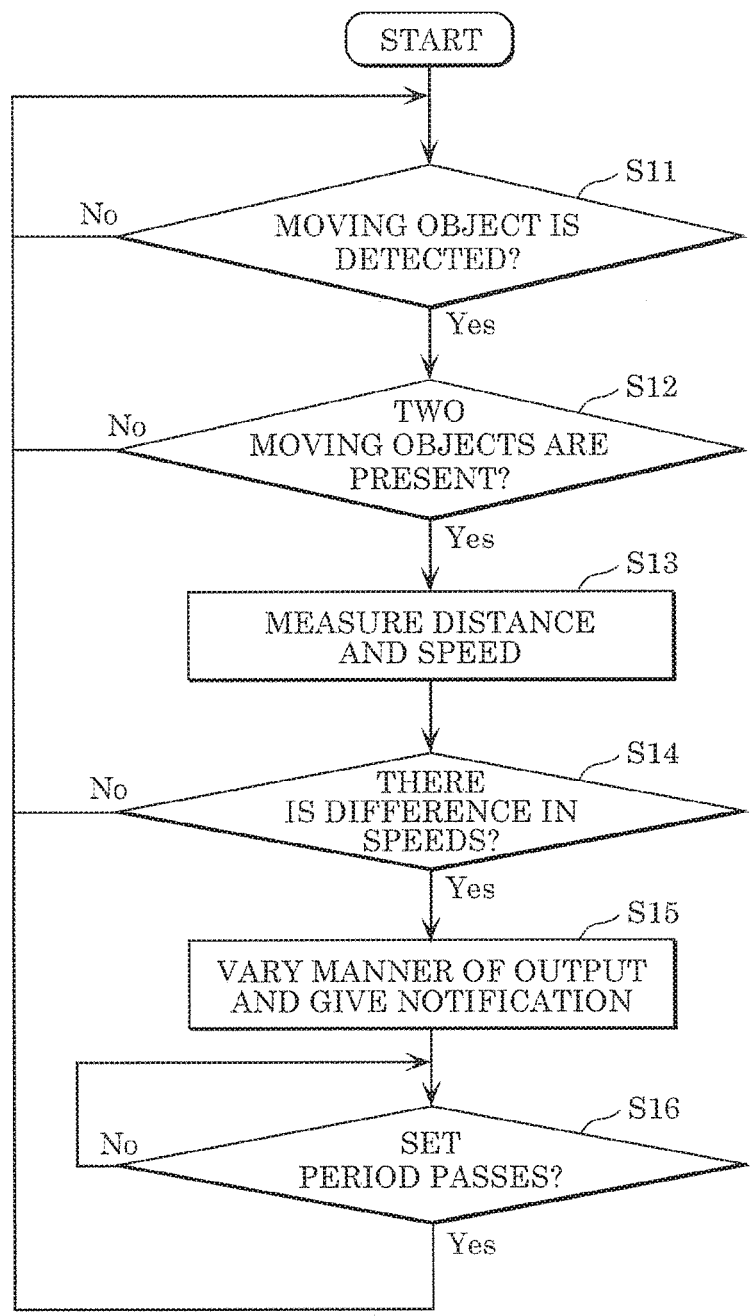
FIG. 3 is a flowchart which illustrates an operation example of the warning device according to Embodiment 1.
Figure 4A:
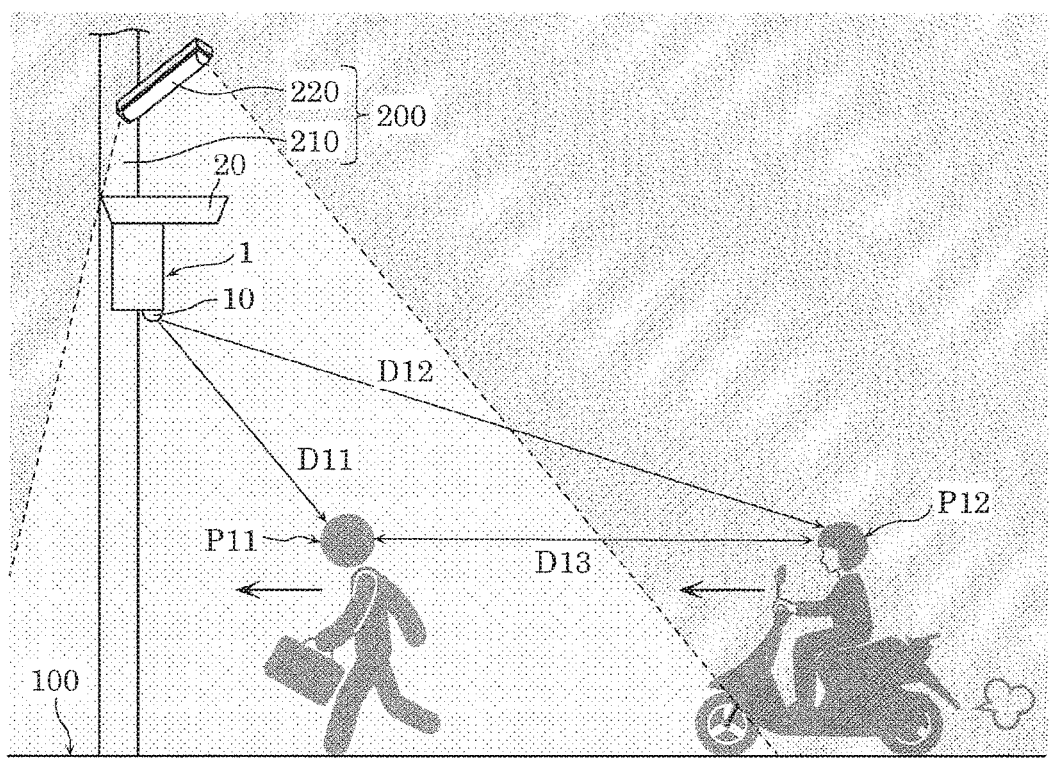
FIG. 4A is a diagram which illustrates a state immediately before a notifier of the warning device according to Embodiment 1 performs notification.
Figure 4B:
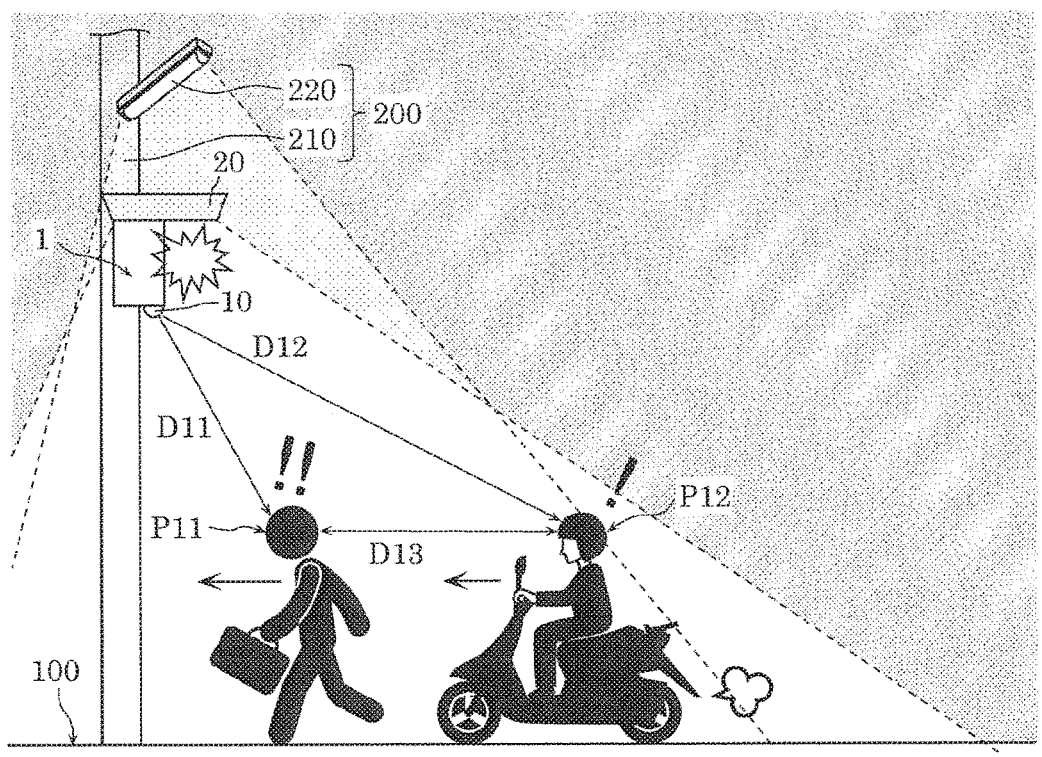
FIG. 4B is a diagram which illustrates a state in which the notifier of the warning device according to Embodiment 1 performs notification.

The following describes an example of a specific operation performed by warning device 1 according to Embodiment 1, with reference to FIG. 1, FIG. 3, FIG. 4A and FIG. 4B. FIG. 3 is a flowchart which illustrates an operation example of warning device 1 according to Embodiment 1. FIG. 4A and FIG. 4B are diagrams each for explaining an operation example of warning device 1. FIG. 4A illustrates a state immediately before notifier 20 performs notification. FIG. 4B illustrates a state in which notifier 20 performs notification. According to the present embodiment, the case where two-wheel vehicle P12 approaches, from behind, to pedestrian P11 who is walking on road 100 will be described.

As indicated in FIG. 3, warning device 1 detects whether or not a moving object is present in a detection range of sensor 10 (S11).

When a moving object enters the detection range of sensor 10 and is detected by sensor 10 (Yes in S11), controller 30 determines whether or not two moving objects are detected (S12). When a moving object is not detected by sensor 10 (No in S11), warning device 1 repeats the processing of detecting whether or not a moving object is present in the detection range of sensor 10.

When two moving objects are detected in the detection range of sensor 10 (Yes in S12), sensor 10 measures, for each of the two moving objects detected by sensor 10, a distance between sensor 10 and the moving object (sensor-object distance) and a speed of the moving object (S13).

On the other hand, even when a moving object is detected by sensor 10 (Yes in S11), the sensor-object distance and the speed of each of the moving objects are not measured in the case where only one moving object or three or more moving objects are detected in the detection range of sensor 10 (No in S12). In other words, the sensor-object distance and the speed of each of the moving objects are measured only when two moving objects are present in the detection range of sensor 10.

For example, as illustrated in FIG. 4A, when only pedestrian P11 is present in the detection range of sensor 10 and detected, the speed of pedestrian P11 is not measured. However, as illustrated in FIG. 4B, when pedestrian P11 and two-wheel vehicle P12 are present in the detection range of sensor 10 and only the two moving objects; that is, pedestrian P11 and two-wheel vehicle P12, are detected, sensor 10 measures the speed of each of pedestrian P11 and two-wheel vehicle P12, together with measuring, as the sensor-object distances, first distance D11 between sensor 10 and pedestrian P11 that is the short-distance object and, and second distance D12 between sensor 10 and two-wheel vehicle P12 that is the long-distance object.

When there is a difference in the speeds of the two moving objects detected by sensor 10 (Yes in S14), notifier 20 performs notification using the predetermined output, by varying a manner of the predetermined output according to the sensor-object distances measured by sensor 10 (S15). For example, when controller 30 determines that there is a difference in the speeds of two moving objects, and that one of the two moving objects is approaching to the other, notifier 20 performs notification by varying a manner of light. Examples of the manner of light include brightness, a light color, blinking, flash, distribution of light, etc., and to vary the manner of light means causing brightness, a light color, blinking, flash, distribution of light, etc. to be varied.

More specifically, when two-wheel vehicle P12 is gradually approaching to pedestrian P11, for example, and thus there is a difference in the speeds of pedestrian P11 and two-wheel vehicle P12, notifier 20 performs notification by varying a manner of light to be emitted according to first distance D1 and second distance D12 which are measured by sensor 10. For example, as the difference between second distance D12 and first distance D11 decreases (i.e., as two-wheel vehicle P12 approaches to pedestrian P11), notifier 20 increases the brightness level of light gradually or at regular intervals, increases the speed of changing a light color gradually or at regular intervals, or increases the number of blinking gradually or at regular intervals.

It should be noted that, instead of performing the notification when there is a difference in speeds of two moving objects, notifier 20 may perform notification when a difference in speeds of two moving objects is greater than or equal to a predetermined threshold, and may avoid performing of the notification when a difference in speeds of two moving objects is less than the threshold. Alternatively, the notification performed by notifier 20 may be carried out when two-wheel vehicle P12 (long-distance object) abruptly accelerates, instead of or in addition to the case where there is a difference in speeds of two moving objects. In addition, the notification performed by notifier 20 by varying a manner of light may be carried out not according to the sensor-object distances (first distance D1, second distance D12) but third distance D13 (moving object distance) that is a distance between pedestrian P11 and two wheel vehicle P12.

After notifier 20 performs notification using predetermined output, controller 30 determines whether or not a predetermined set period has passed (S16). For example, a timer measures a period of time passed after notifier 20 performs notification, and controller 30 determines whether or not the measured period of time exceeds the set period.

As a result, when controller 30 determines that the measured period of time does not exceed the set period after notifier 20 performed notification (No is S16), the above-described notification is repeatedly performed by notifier 20. On the other hand, when controller 30 determines that the measured period of time exceeds the set period after notifier 20 performed notification (Yes in S16), the process of performing the notification by notifier 20 is once terminated, and the process returns to Step S11.

According to the present embodiment, two moving objects which are approaching to each other are notified that they are approaching to each other, with the operations described above.

It should be noted that, although notifier 20 performs notification by outputting light in the above-described operation example, the output is not limited to this example. Notifier 20 may perform notification by outputting a sound, by outputting an aroma, by performing display on a mobile terminal, etc.

Furthermore, although the case where two-wheel vehicle P12 approaches to pedestrian P11 from behind pedestrian P11 is explained as an example of two moving objects are approaching to each other in the present embodiment, the present disclosure is not limited to this case. For example, the present disclosure can also be applied to the case where another person approaches to pedestrian P11 from behind pedestrian P11. Alternatively, the present disclosure can also be applied to the case where two-wheel vehicle P12 or another person approaches to pedestrian P11 from the front of pedestrian P11 (the case of approaching to each other). In this case, the present disclosure is particularly useful when pedestrian P11 is focused on a mobile terminal, and thus is not aware of two-wheel vehicle P12 or another pedestrian approaching to pedestrian P11 from the front.

Conclusion

As described above, warning device 1 according to the present embodiment includes sensor 10 capable of measuring a distance, and notifier 20 which performs notification using predetermined output. Sensor 10 measures at least one of: sensor-object distances which are distances between sensor 10 and each of at least two moving objects which are approaching to each other; and a moving object distance which is a distance between the at least two moving objects which are approaching to each other. Notifier 20 performs notification by varying a manner of the predetermined output according to the sensor-object distances or the moving object distance measured by sensor 10.

In this manner, warning device 1 according to the present embodiment varies a manner of the predetermined output when notifier 20 performs notification using the predetermined output. With this, it is possible to cause two moving objects which are approaching to each other to be easily aware that one of the two moving objects is approaching to the other.

For example, when two-wheel vehicle P12 is approaching to pedestrian P11, it is possible to cause pedestrian P11 to be easily aware that two-wheel vehicle P12 is approaching to pedestrian P11, by performing the notification varying a manner of the predetermined output. In other words, it is possible to call pedestrian P11' attention to cause pedestrian P11 to be easily notice that two-wheel vehicle P12 is approaching to pedestrian P11. In this manner, it is possible to alarm pedestrian P11 so as not to fall victim to a crime, or so as to prevent collision with two-wheel vehicle P12.

In contrast, in such a case where a driver of two-wheel vehicle P12 is trying to commit a crime, such as snatching, against pedestrian P11, it is possible to startle the driver of two-wheel vehicle P12 by performing the notification by varying a manner of the predetermined output. In this manner, it is possible to discourage the driver of two-wheel vehicle P12 from committing snatching. As a result, it is possible to keep the driver of two-wheel vehicle P12 from committing a crime.

As described above, with warning device 1 according to the present embodiment, it is possible to not only cause pedestrian P11 to be easily aware that any moving object approaches to pedestrian P11, but also prevent pedestrian P11 from falling victim to a crime. Thus, it is possible to suppress occurrence of a crime.

In addition, according to the present embodiment, notifier 20 may perform notification according to a variation in the sensor object distances or the moving object distance. For example, in such a case where a rate of variation of the sensor-object distances or the moving object distance relative to a time is large, it is possible to determine that one of the two moving objects is rapidly approaching to the other. Accordingly, a manner of the predetermined output carried out by notifier 20 may be largely varied.

With this, it is possible to cause two moving objects which are rapidly approaching to each other to be easily and promptly aware that one of the two moving objects is approaching to the other.

In addition, according to the present embodiment, sensor 10 may further detect an acceleration of the long-distance object among the short-distance object and the long-distance object included in the at least two moving objects, and may further perform notification according to presence or absence of an acceleration of the long-distance object.

In this manner, since notification is performed by notifier 20 when the long-distance object abruptly approaches to the short-distance object, it is possible to cause the short-distance object to be easily aware that the long-distance object is abruptly approaching to the short-distance object.

In addition, according to the present embodiment, notifier 20 avoids performing of the notification when the at least two moving objects include three or more moving objects.

A crime such as snatching is likely to occur when one victim and one victimizer are present alone. In other words, it is known that very few victimizers commit a crime such as snatching for pleasure, and that a crime is difficult to commit in a circumstance in which a witness is present around. In view of the above, notifier 20 avoids performing of the notification when three or more moving objects are detected by sensor 10, and performs notification only when two moving objects are detected by sensor 10. In this manner, it is possible to effectively suppress a crime such as snatching, while more than necessary performing of notification by notifier 20 is prevented.

In addition, according to the present embodiment, notifier 20 includes a light source, and the predetermined output performed by notifier 20 is an output using light of the light source. More specifically, notifier 20 performs notification by varying a manner of light emitted by the light source according to the sensor-object distances or the moving object distance.

With this, it is possible to cause two moving objects which are approaching to each other to be easily visually aware that one of the two moving objects is approaching to the other. Furthermore, a crime such as snatching occurs at a high rate during night-time. However, performing the notification using a sound during night-time might lead to a different problem, such as noise complaint. In view of the above, notification is performed by outputting not a sound but light. In this manner, it is possible to cause two moving objects to be easily aware that one of the two moving objects is approaching to the other, without causing a problem of such noise complaint.

In addition, according to the present embodiment, notifier 20 and sensor 10 are integrated.

With this configuration, it is possible to attach, to a predetermined structure, notifier 20 and sensor 10 integrally. For example, sensor 10 is attached to a supporting member that is fixedly installed, thereby allowing notifier 20 also to be attached to the supporting member.

In addition, according to the present embodiment, warning device 1 is supplied with power via a supporting member.

With this configuration, warning device 1 is capable of receiving power using the supporting member to which warning device 1 is attached.

In addition, according to the present embodiment, the supporting member is fixed in a state in which a portion of the supporting member is embedded in the ground.

With this configuration, it is possible to attach warning device 1 to the supporting member which has a portion embedded in the ground. In other words, it is possible to install warning device 1 using the supporting member (power pole, etc.) which has a portion embedded in the ground. Accordingly, it is possible to fixedly install warning device 1 easily and stably.

In addition, according to the present embodiment, the supporting member is support column 210 which has a pillar shape and is fixed to a street, and to which lighting device 220 which illuminates the road is attached.

With this configuration, it is possible to install warning device 1 using street light 200 including lighting device 200 attached to support column 210. Accordingly, it is possible to fixedly install warning device 1 easily and stably, and to use street light 200 as a security lamp.

Embodiment 2

Figure 5:
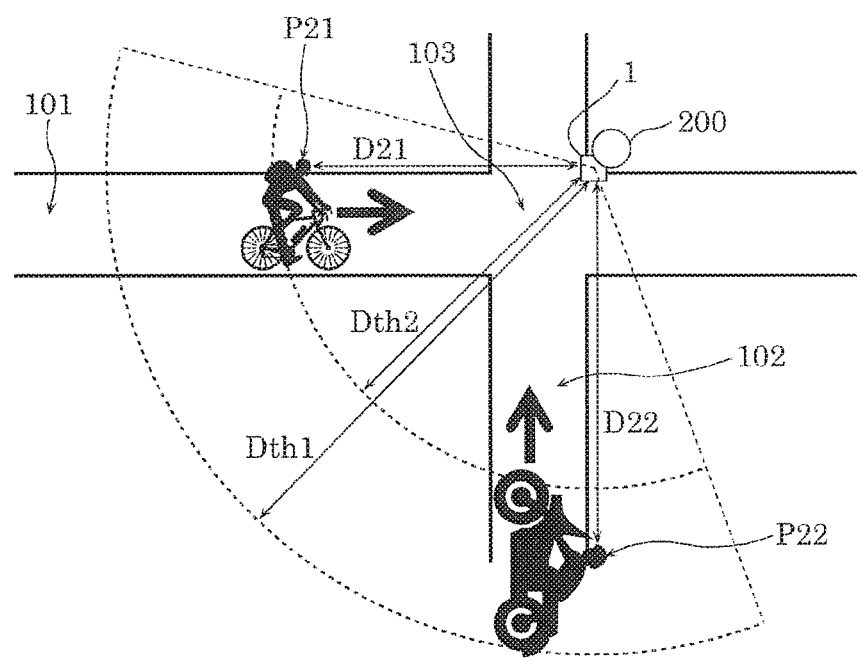
FIG. 5 is a diagram which illustrates an installation example of the warning device according to Embodiment 2.

The following describes Embodiment 2 with reference to FIG. 5. FIG. 5 is a diagram which illustrates an installation example of warning device 1 according to Embodiment 2. Warning device 1 according to the present embodiment has a configuration identical to the configuration of warning device 1 according to Embodiment 1. Accordingly, the configuration of warning device 1 will be described with reference to FIG. 1.

According to the present embodiment, sensor 10 of warning device 1 is installed such that a detection range of sensor 10 includes an intersection at which at least two streets intersect with each other.

More specifically, warning device 1 including sensor 10 and notifier 20 is installed in proximity to crossing 103 (intersection) between first road 101 and second road 102 as illustrated in FIG. 5. As an example, warning device 1 is attached to street light 200 fixedly installed in proximity to crossing 103. However, warning device 1 is not limited to this example.

In addition, according to the present embodiment, first two-wheel vehicle P21 (for example, a bicycle) travels along first road 101 toward crossing 103, and second two-wheel vehicle P22 travels along second road 102 toward crossing 103. In other words, first two-wheel vehicle P21 and second two-wheel vehicle P22 are approaching to each other.

Sensor 10 measures, as sensor-object distances, first distance D21 between first two-wheel vehicle P21 and sensor 10 (crossing 103), and second distance D2 between second two-wheel vehicle P22 and sensor 10 (crossing 103).

Notifier 20 performs notification using predetermined output when (i) first two-wheel vehicle P21 and second two-wheel vehicle P22 are present in separate roads (first road 101 and second road 102) and (ii) a distance between first two-wheel vehicle P21 and crossing 103 and a distance between second two-wheel vehicle P22 and crossing 103 are each less than or equal to a predetermined threshold. In this case, notifier 20 performs notification by varying a manner of the predetermined output according to the sensor-object distances measured by sensor 10.

Notifier 20 performs notification by outputting light, for example, in the same manner as notifier 20 in Embodiment 1. However, the output is not limited to this example. Notifier 20 may perform notification by outputting a sound, by outputting an aroma, by performing display on a mobile terminal, etc.

Figure 6:
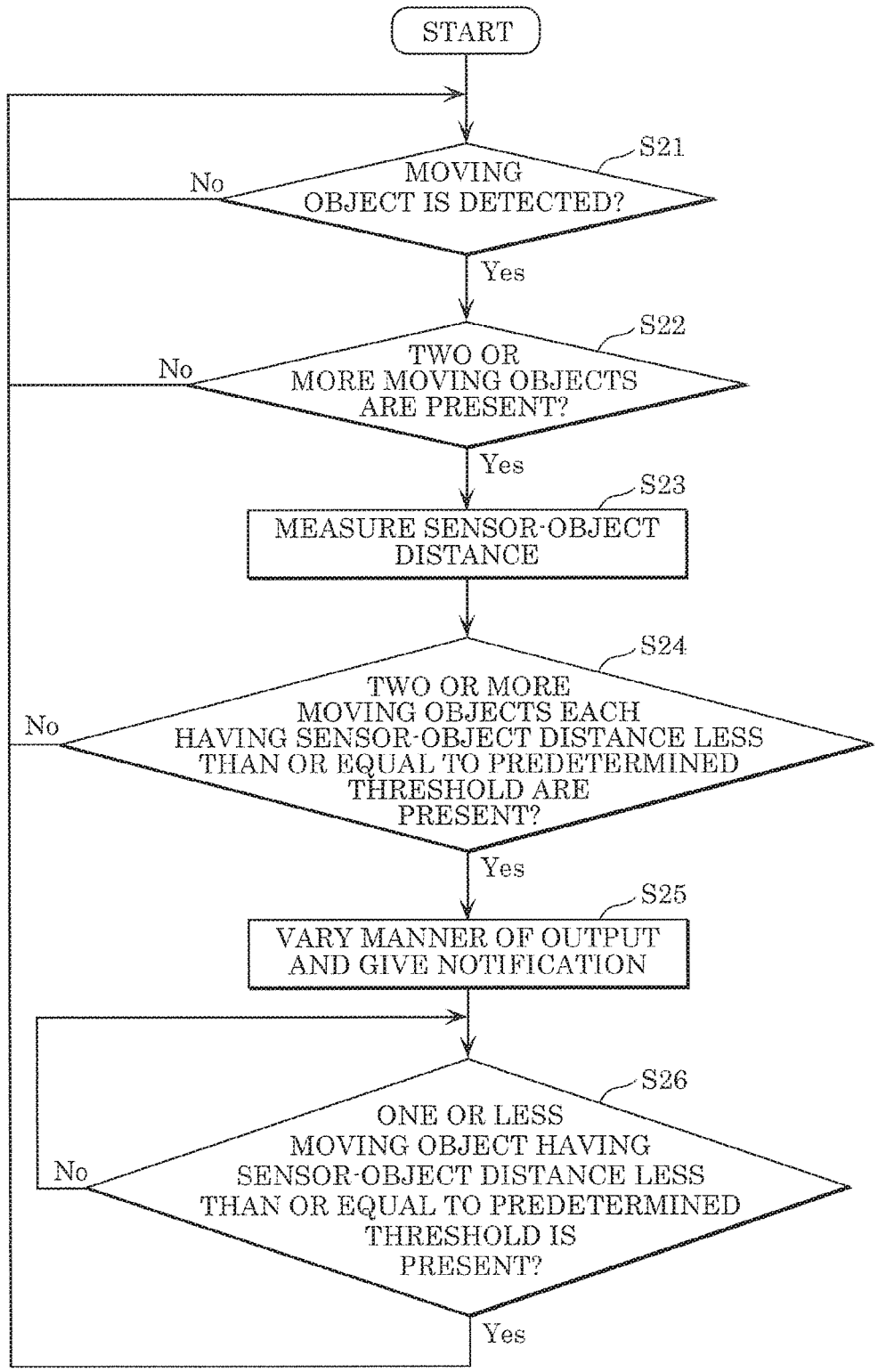
FIG. 6 is a flowchart which illustrates an operation example of the warning device according to Embodiment 2.

The following describes an example of a specific operation performed by warning device 1 according to Embodiment 2, with reference to FIG. 5 and FIG. 6. FIG. 6 is a flowchart which illustrates an operation example of warning device 1 according to Embodiment 2.

As indicated in FIG. 6, warning device 1 detects whether or not a moving object is present in the detection range of sensor 10 (S21).

When a moving object enters the detection range of sensor 10 and is detected by sensor 10 (Yes in S21), controller 30 determines whether or not two or more moving objects are detected (S22). When a moving object is not detected by sensor 10 (No in S21), warning device 1 repeats the processing of detecting whether or not a moving object is present in the detection range of sensor 10.

When two or more moving objects are detected in the detection range of sensor 10 (Yes in S22), sensor 10 measures, for each of the two or more moving objects detected by sensor 10, a distance between sensor 10 and the moving object (sensor-object distance) (S23). In other words, a distance to crossing 103 is measured for each of the moving objects.

For example, when first two-wheel vehicle P21 travels along first road 101 and second two-wheel vehicle P22 travels along second road 102 as illustrated in FIG. 5, sensor 10 measures, as sensor-object distances, first distance D21 between first two-wheel vehicle P21 and sensor 10, and second distance D22 between second two-wheel vehicle P22 and sensor 10.

On the other hand, even when a moving object is detected by sensor 10 (Yes in S21), the sensor-object distance is not measured in the case where two or more moving objects are not present in the detection range of sensor 10 (No in S22). In other words, when only one moving object is present in the detection range of sensor 10, the sensor-object distance is not measured.

Next, controller 30 determines whether or not two or more moving objects whose sensor-object distances (first distance D21, second distance D22) measured by sensor 10 are each less than or equal to a predetermined threshold are detected (S24). The predetermined threshold is, for example, a constant value.

When two or more moving objects whose sensor-object distances measured by sensor 10 are each less than or equal to the predetermined threshold are detected (Yes in S24), notifier 20 performs notification using the predetermined output by varying a manner of the predetermined output according to the sensor-object distances measured by sensor 10 (S25).

According to the present embodiment, only two moving objects; that is, first two-wheel vehicle P21 and second two-wheel vehicle P22, are present as illustrated in FIG. 5. Accordingly, notifier 20 performs notification by varying a manner of light, when both of first distance D21 and second distance D22 (sensor-object distances) measured by sensor 10 are less than or equal to the predetermined threshold ($D_{th1}$). The notification performed by varying a manner of light light is substantially the same as the notification performed by varying a manner of light according to Embodiment 1.

When only one moving object, whose sensor-object distance measured by sensor 10 is less than or equal to the predetermined threshold is detected (No in S24), the process of performing the notification by notifier 20 is once terminated, and the process returns to Step S21.

After notifier 20 performs notification using the predetermined output in Step S25, controller 30 determines whether or not one or less moving object whose sensor-object distance is less than or equal to the predetermined threshold ($D_{th1}$) is present (S26).

When controller 30 determines that more than one moving object whose sensor-object distance is less than or equal to the predetermined threshold ($D_{th1}$) is present (No in S26), the process of the above-described performing of the notification by notifier 20 is continued. On the other hand, when controller 30 determines that one or less moving object whose sensor-object distance is less than or equal to the predetermined threshold ($D_{th1}$) is present (Yes in S26), the process of performing the notification by notifier 20 is once terminated, and the process returns to Step S21.

According to the present embodiment, two moving objects which are approaching to each other are notified that they are approaching to each other, with the operations described above.

As described above, in the same manner as Embodiment 1 described above, warning device 1 according to the present embodiment includes sensor 10 capable of measuring a distance, and notifier 20 which performs notification using predetermined output. Sensor 10 measures the sensor-object distances which are distances between sensor 10 and each of at least two moving objects which are approaching to each other. Notifier 20 performs notification by varying a manner of the predetermined output according to the sensor-object distances measured by sensor 10.

With this, it is possible to cause two moving objects which are approaching to each other to be easily aware that one of the two moving objects is approaching to the other.

In addition, according to the present embodiment, sensor 10 is installed such that the detection range of sensor 10 includes an intersection at which at least two streets intersect with each other, and notifier 20 performs notification by varying a manner of the predetermined output, when at least two moving objects are present in at least two separate streets, and the distances between the intersection and each of the at least two moving objects are each less than or equal to a predetermined threshold.

For example, when two or more moving objects whose sensor-object distances measured by sensor 10 are each less than or equal to the predetermined threshold ($D_{th1}$) are detected, notifier 20 performs notification by varying a manner of the predetermined output according to the sensor object distances measured by sensor 10.

In this manner, in such a case where two moving objects; that is, first two-wheel vehicle P21 and second two-wheel vehicle P22, travel toward the same intersection (crossing 103) as illustrated in FIG. 5, notification is performed by varying a manner of the predetermined output according to the sensor-object distances measured by sensor 10, thereby making it possible to cause each of first two-wheel vehicle P21 and second two-wheel vehicle P22 to be easily aware that any moving object is approaching thereto. In this manner, it is possible to prevent collision between first two-wheel vehicle P21 and second two-wheel vehicle P22.

It should be noted that, in the case where, sensor 10 continues to measure first distance D21 and second distance D22 after notifier 20 starts performing the notification, and further, both of first distance D21 and second distance D22 (sensor-object distances) are equal to threshold $D_{th2}$ (second threshold) that is smaller than threshold $D_{th1}$ (first threshold), notifier 20 may further perform notification using the predetermined output by varying a manner of the predetermined output according to the sensor-object distances measured by sensor 10. In this manner, a manner of light is varied further in a stepwise manner, and thus it is possible to cause two or more moving objects to be surely aware that any moving object is approaching thereto.

In addition, according to the present embodiment, sensor 10 may measure a speed and an acceleration rate of each moving object, and notifier 20 may adjust a manner of output that is varied, according to the speed and the acceleration rate which are measured. For example, the threshold of output that is varied may be adjusted by notifier 20. More specifically, a threshold of a brightness level of light is raised when it is detected that two moving objects are rapidly approaching to each other, thereby making it possible to vary a manner of output ahead of time. In this manner, it is possible to notify two moving objects of danger of collision in an earlier stage.

Furthermore, in this case, a position of a moving object a few seconds later, for example, may be predicted on the basis of a result of measurement (a distance, a speed, an acceleration rate) performed by sensor 10 to estimate a time at which two moving objects will collide, and a manner of output may be varied prior to the time of collision. In this manner, it is possible to reliably prevent collision between two moving objects.

In addition, according to the present embodiment, notifier 20 may perform notification according to a variation in the sensor-object distances, in the same manner as Embodiment 1.

In this manner, it is possible to cause two moving objects which are rapidly approaching to each other to be easily and promptly aware that one of the two moving objects is approaching to the other.

In addition, according to the present embodiment, notifier 20 includes a light source, and the predetermined output performed by notifier 20 is an output using light of the light source, in the same manner as Embodiment 1.

In this manner, it is possible to cause two moving objects which are approaching to each other to be easily visually aware that one of the two moving objects is approaching to the other. Furthermore, a collision on a road occurs at a high rate in a state in which a vehicle without a lamp is difficult to notice, or during night-time when a decrease in visibility might occur. However, performing of notification using a sound during night-time might lead to a different problem, such as noise complaint. In view of the above, the notification is performed by outputting not a sound but light. In this manner, it is possible to easily prevent collision between two moving objects without causing a problem of such noise complaint.

In addition, according to the present embodiment, notifier 20 and sensor 10 are integrated in the same manner as Embodiment 1.

With this configuration, it is possible to attach, to a predetermined structure, notifier 20 and sensor 10 integrally.

as with Embodiment 1, warning device 1 is supplied with power via a supporting member, in the same manner as Embodiment 1.

With this configuration, warning device 1 is capable of receiving power using the supporting member to which warning device 1 is attached.

In addition, according to the present embodiment, the supporting member is fixed in a state in which a portion of the supporting member is embedded in the ground, in the same manner as Embodiment 1.

With this configuration, it is possible to install warning device 1 using the supporting member (power pole, etc.) which has a portion embedded in the ground. Accordingly, it is possible to fixedly install warning device 1 easily and stably.

In addition, according to the present embodiment, the supporting member is a support column which has a pillar shape and is fixed to a road, and to which a lighting device that illuminates the road is attached, in the same manner as Embodiment 1.

With this configuration, it is possible to install warning device 1 using street light 200 including the lighting device attached to the support column. Accordingly, it is possible to fixedly install warning device 1 easily and stably, and to use street light 200 as a security lamp.

It should be noted that, although notifier 20 performs notification by outputting light according to the present embodiment, the output is not limited to this example. Notifier 20 may perform notification by outputting a sound, by outputting an aroma, by performing display on a mobile terminal, etc., in the same manner as Embodiment 1.

Modification Example of Embodiment 2

Figure 7:
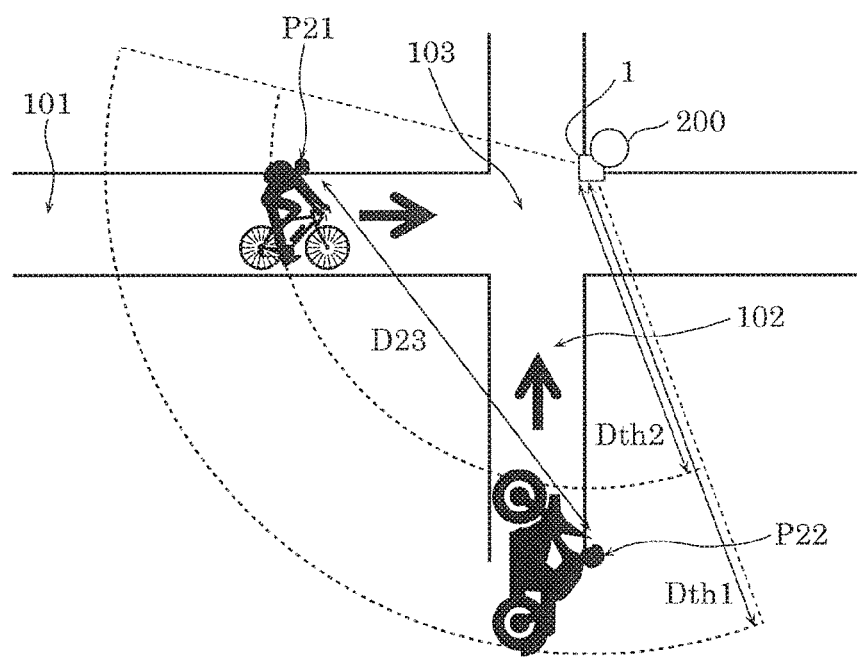
FIG. 7 is a diagram which illustrates an installation example of the warning device according to a modification example of Embodiment 2.

The following describes a modification example of Embodiment 2 with reference to FIG. 7. FIG. 7 is a diagram which illustrates an installation example of warning device 1 according to a modification example of Embodiment 2. As with Embodiment 2, warning device 1 according to the present modification example has a configuration identical to the configuration of warning device 1 according to Embodiment 1. Accordingly, the configuration of warning device 1 will be described with reference to FIG. 1.

The present modification example is different from the foregoing Embodiment 2 in that, whereas notifier 20 performs notification by varying a manner of the predetermined output according to sensor-object distances (first distance D21, second distance D22) measured by sensor 10 according to the foregoing Embodiment 2, notifier 20 performs notification by varying a manner of the predetermined output according to a moving object distance measured by sensor 10 as illustrated in FIG. 7 according to the present modification example. The moving object distance is a distance between first two-wheel vehicle P21 and second two-wheel vehicle P22 (third distance D23), and measured by sensor 10.

Figure 8:
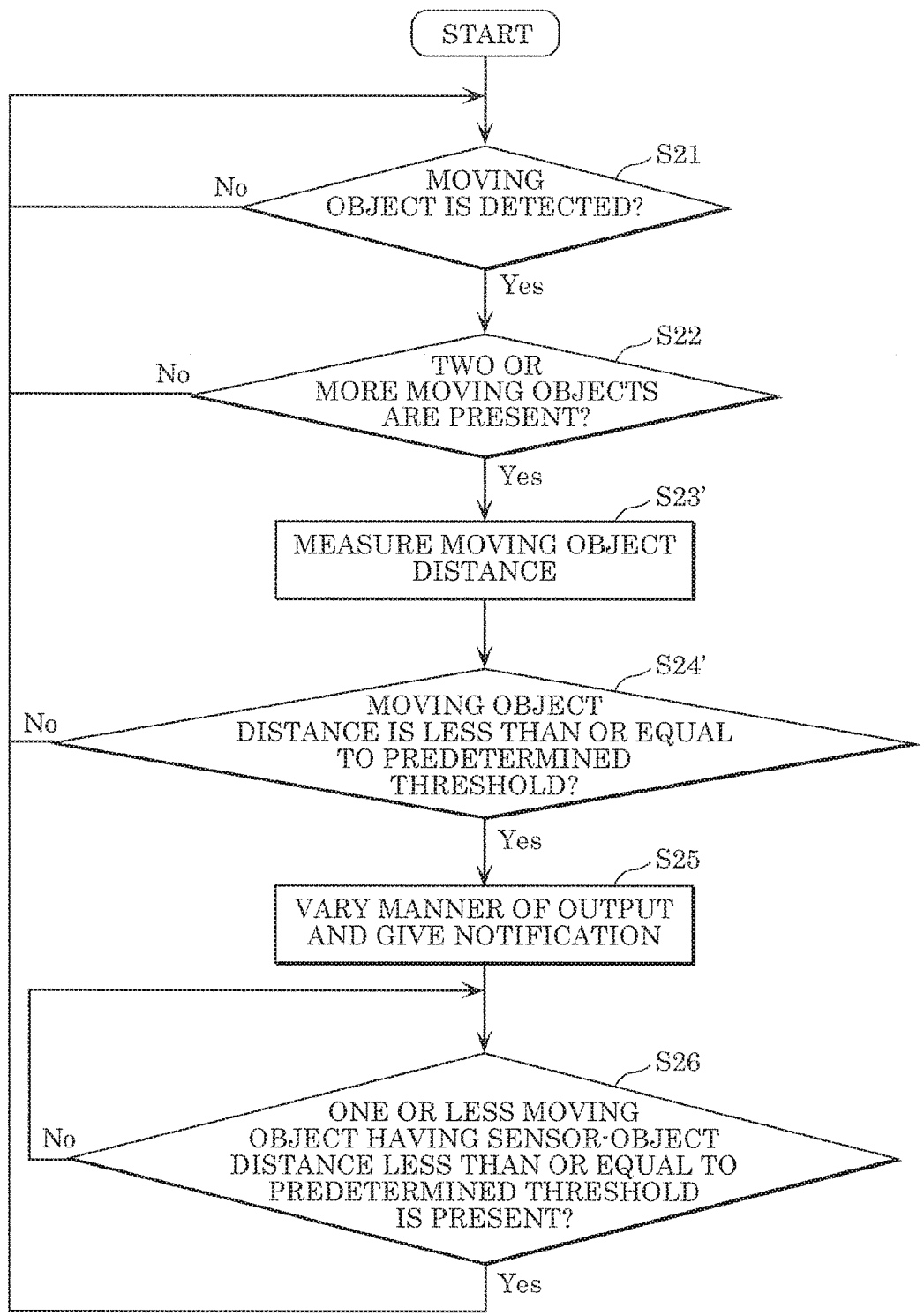
FIG. 8 is a flowchart which illustrates an operation example of the warning device according to the modification example of Embodiment 2.

The following describes an example of a specific operation performed by warning device 1 according to the modification example of Embodiment 2, with reference to FIG. 7 and FIG. 8. FIG. 8 is a flowchart which illustrates an operation example of warning device 1 according to the modification example of Embodiment 2. It should be noted that descriptions for processes same as the processes indicated in FIG. 6 will be omit or simplified.

As indicated in FIG. 8, warning device 1 detects whether or not a moving object is present in the detection range of sensor 10 (S21).

When a moving object enters the detection range of sensor 10 and is detected by sensor 10 (Yes in S21), controller 30 determines whether or not two or more moving objects are detected (S22).

When two or more moving objects are detected in the detection range of sensor 10 (Yes in S22), sensor 10 measures a distance between the two or more moving objects (moving object distance) for each of the two or more moving objects detected by sensor 10 (S23').

For example, when first two-wheel vehicle P21 travels along first road 101 and second two-wheel vehicle P22 travels along second road 102 as illustrated in FIG. 7, sensor 10 measures third distance D23 between first two-wheel vehicle P21 and second two-wheel vehicle 122 as the moving object distance. In the present modification example, sensor 10 also measures, as the sensor-object distances, first distance D21 between first two-wheel vehicle P21 and sensor 10, and second distance D22 between second two-wheel vehicle P22 and sensor 10.

Next, controller 30 determines whether or not the moving object distance (third distance D23) measured by sensor 10 is less than or equal to a predetermined threshold (S24'). The predetermined threshold is, for example, a constant value.

When the moving object distance measured by sensor 10 is less than or equal to the predetermined threshold (Yes in S24'), notifier 20 per notification using the predetermined output by varying a manner of the predetermined output according to the moving object distance measured by sensor 10 (S25).

According to the present modification example, when third distance D23 (moving object distance) measured by sensor 10 is less than or equal to the predetermined threshold as illustrated in FIG. 7 notifier 20 performs notification by varying a manner of light. The notification performed by varying, a manner of light is substantially the same as the notification performed by varying a manner of light according to Embodiment 2.

When the moving object distance measured by sensor 10 is greater than the predetermined threshold (No in S24'), the process of performing of the notification by notifier 20 is once terminated, and the process returns to Step S21.

After notifier 20 performs notification using the predetermined output in Step S24', controller 30 determines whether or not one or less moving object whose sensor-object distance (first distance D21, second distance D22) is less than or equal to the predetermined threshold is present (S26), in the same manner as Embodiment 2.

When controller 30 determines that more than one moving object whose sensor-object distances is less than or equal to the predetermined threshold is present (No in S26), the process of the above-described performing of the notification by notifier 20 is continued. On the other hand, when controller 30 determines that one or less moving object whose sensor-object distance is less than or equal to the predetermined threshold is present (Yes in S26), the process of performing of the notification by notifier 20 is once terminated, and the process returns to Step S21.

According to the present modification example, two moving objects which are approaching to each other are notified that they are approaching to each other, with the operations described above.

As described above, in the same manner as Embodiment 1 described above, warning device 1 according to the present modification example includes sensor 10 capable of measuring a distance, and notifier 20 which performs notification using predetermined output. Sensor 10 measures the moving object distance which is a distance between sensor 10 and each of at least two moving objects which are approaching to each other. Notifier 20 performs notification by varying a manner of the predetermined output according to the moving object distance measured by sensor 10.

With this, it is possible to cause two moving objects which are approaching to each other to be easily aware that one of the two moving objects is approaching to the other.

In addition, according to the present modification example, sensor 10 is installed such that the detection range of sensor 10 includes an intersection at which at least two streets intersect with each other, and notifier 20 performs notification by varying a manner of the predetermined output, when at least two moving objects are present in at least two separate streets, and the distance between the at least two moving objects is less than or equal to a predetermined threshold.

For example, when a distance between two moving objects (moving object distance) measured by sensor 10 is less than or equal to a predetermined threshold, notifier 20 performs notification using predetermined output by varying a manner of the predetermined output according to the moving object distance measured by sensor 10.

In this manner, in such a case where two moving objects; that is, first two-wheel vehicle P21 and second two-wheel vehicle P22, travel toward the same intersection (crossing 103) as illustrated in FIG. 7, the notification is performed by varying a manner of the predetermined output according to the moving object distance measured by sensor 10, thereby making it possible to cause each of first two-wheel vehicle P21 and second two-wheel vehicle P22 to be easily aware that any moving object is approaching thereto. In this manner, it is possible to prevent collision between first two-wheel vehicle P21 and second two-wheel vehicle P22.

Embodiment 3

Figure 9:
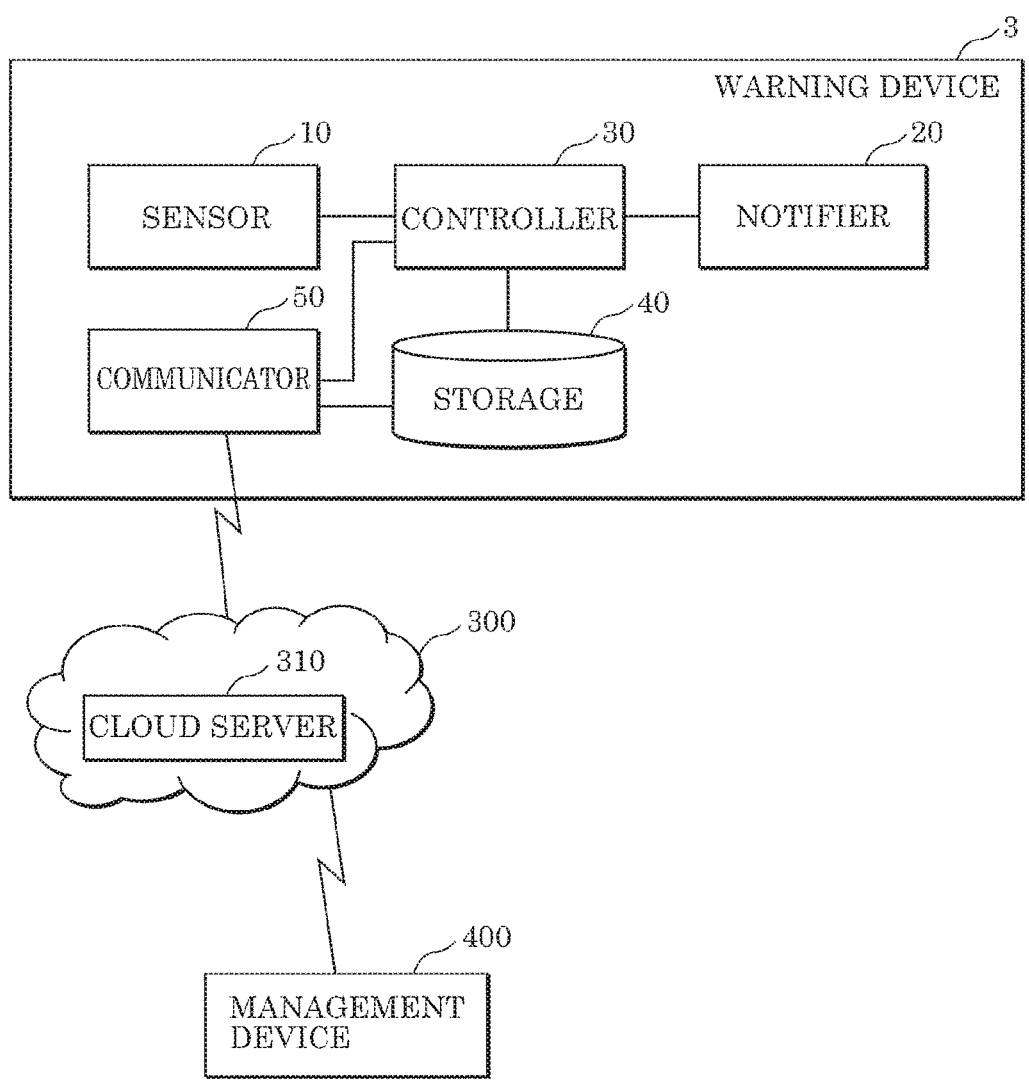
FIG. 9 is a function block diagram which illustrates a configuration of the warning device according to Embodiment 3.

The following describes warning device 3 according to Embodiment 3, with reference to FIG. 9. FIG. 9 is a function block diagram which illustrates a configuration of warning device 3 according to Embodiment 3.

As illustrated in FIG. 9, warning device 3 according to the present embodiment further includes, in addition to the configuration of warning device 1 according to Embodiment 1, communicator 50 which enables warning device 3 to communicate with the outside.

Communicator 50 transmits information related to warning device 3 to the outside of warning device 3. Communicator 50 transmits, for example, information related to the notification performed by notifier 20 and a result of measurement performed by sensor 10, as the information related to warning device 30, to another device or the like other than warning device 3. In this case, communicator 50 may transmit information stored in storage 40 to the other device or the like, or may transmit information on a real-time basis when notifier 20 performs notification and sensor 10 performs detection, to the other device or the like.

In addition, information related to the notification performed by notifier 20 is, for example, details of the notification (a manner of output), a start time or an end time of the notification, the number of times of the notification, etc. In addition, the result of measurement performed by sensor 10 is, for example, information on a distance related to a detected moving object (sensor-object distance, moving object distance), information on a speed, information on an acceleration rate, etc.

In addition, communicator 50 may transmit information related to warning device 3 via internet 300. In this case, communicator 50 may transmit information related to warning device 3 to cloud server 310, and cloud server 310 may manage the information related to warning device 3. In addition, communicator 50 may transmit information related to warning device 3 to management device 400 via internee 300, and management device 400 may manage the information related to warning device 3. Management device 400 is a central control unit, and collets information from a plurality of warning devices 3. Management device 400 is, for example, a terminal device, a terminal server, etc.

With warning device 3 according to the present embodiment, it is possible to produce the same advantageous effects as Embodiment 1. For example, warning device 3 according to the present embodiment produces an advantageous effect that it is possible to cause two moving objects which are approaching to each other to be easily aware that one of the two moving objects is approaching to the other.

In addition, warning device 3 according to the present embodiment includes communicator 50 which enables warning device 3 to communicate with the outside.

In this manner, it is possible to transmit information related to warning device 3 to the outside. Accordingly, information related to the notification performed by warning device 3, etc., can be easily obtained.

Figure 10:
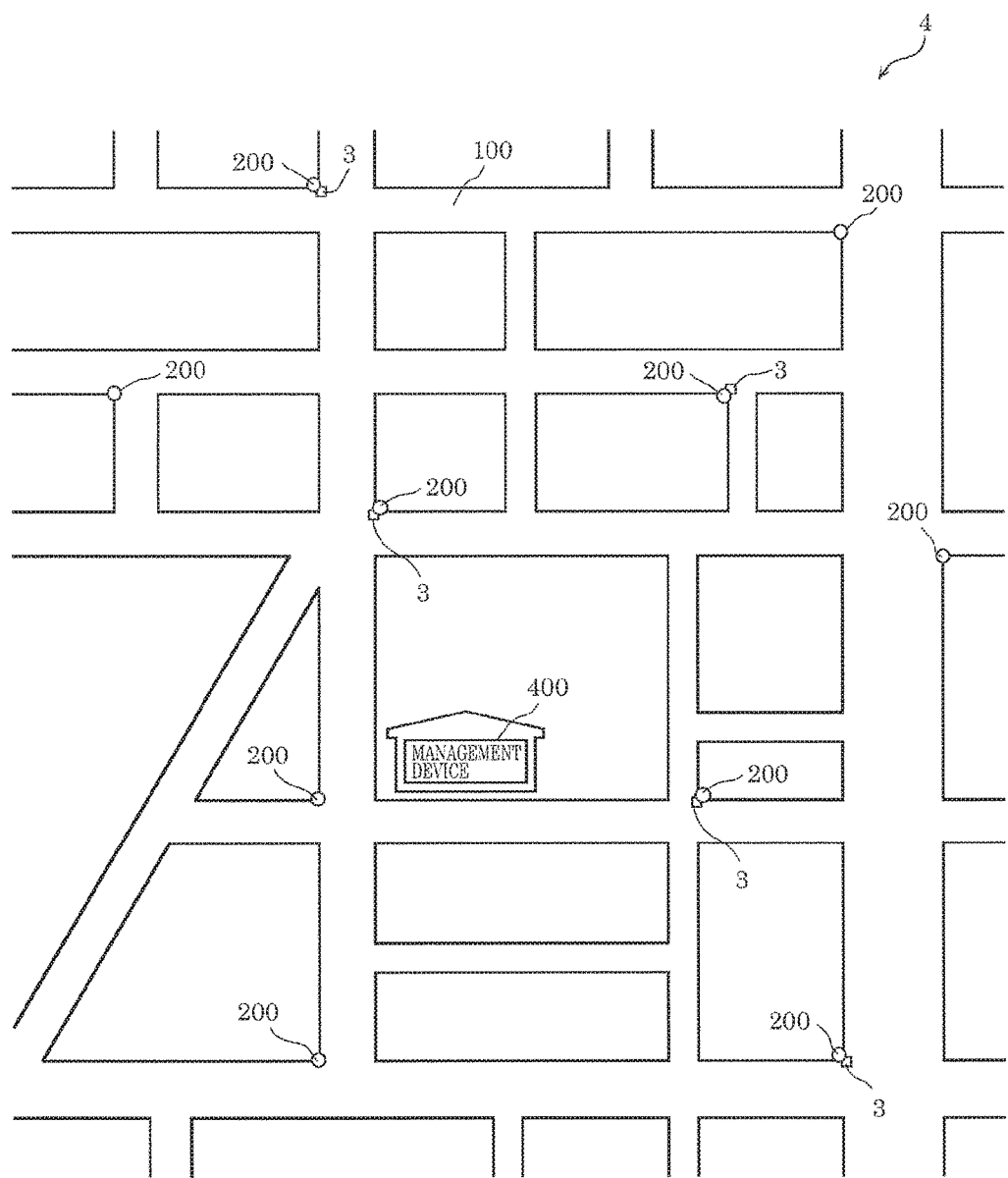
FIG. 10 is a diagram which schematically illustrates a concept of a street light system according to Embodiment 3.

In addition, warning device 3 having such a configuration can be used as street light system 4 as illustrated in FIG. 10. FIG. 10 is a diagram which schematically illustrates a concept of street light system 4 according to Embodiment 3.

As illustrated in FIG. 10, street light system 4 includes a plurality of street lights 200 installed along road 100, a plurality of warning devices 3 attached to the plurality of street lights 200, and management device 400 which manages the plurality of warning devices 3. Management device 400 obtains information related to the notification performed by notifier 20 of each of the plurality of warning devices 3, for example.

As described above, with street light system 4 according to the present embodiment, it is possible obtain and manage information related to the notification performed by notifier 20 of each of the plurality of warning devices 3, by management device 400. Accordingly, it is possible to easily figure out road 100 on which a crime such as snatching or collision are likely to occur. In this manner, it is possible to appropriately take anti-crime measures such as installing a security camera on road 100 on which a crime such as snatching is likely to occur. Furthermore, it is possible to appropriately take safety measures such as installing a mirror, providing a halt line, etc., on road 100 on which collision is likely to occur.

Other Modifications

Although the warning device and the street light system according to the present disclosure have been described on the basis of the embodiments, the present disclosure is not limited to the above-described embodiments.

Figure 11:
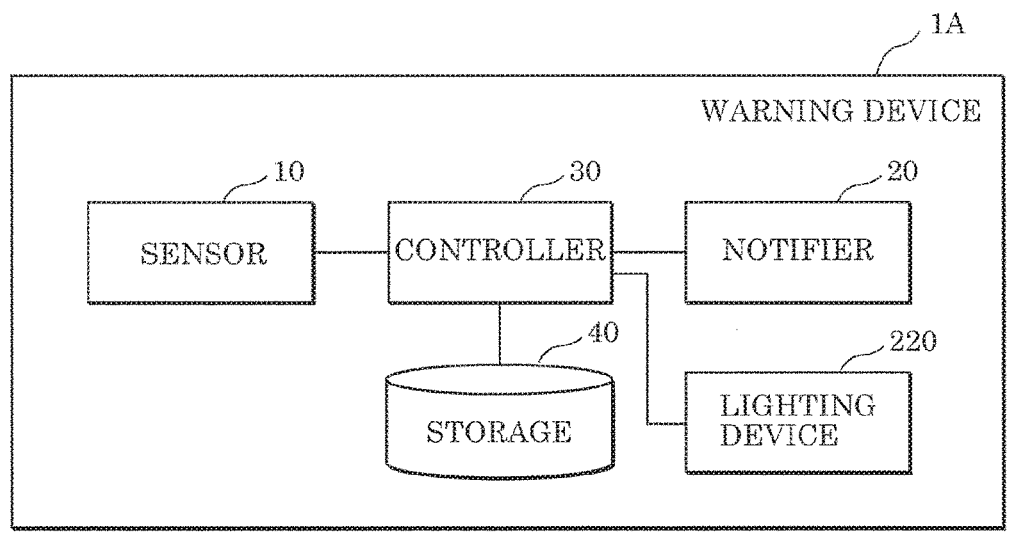
FIG. 11 is a function block diagram which illustrates a configuration of the warning device according to Modification 1.

For example, although lighting device 220 of street light 200 is separate from warning device 1 in each of the above-described embodiments, lighting device 220 may be integrally made with warning device 1A as illustrated in FIG. 11. In other words, in this case, warning device 1A is a part of the street light, and a lighting state of lighting device 220 may be controlled by controller 30 of warning device 1A.

Figure 12:
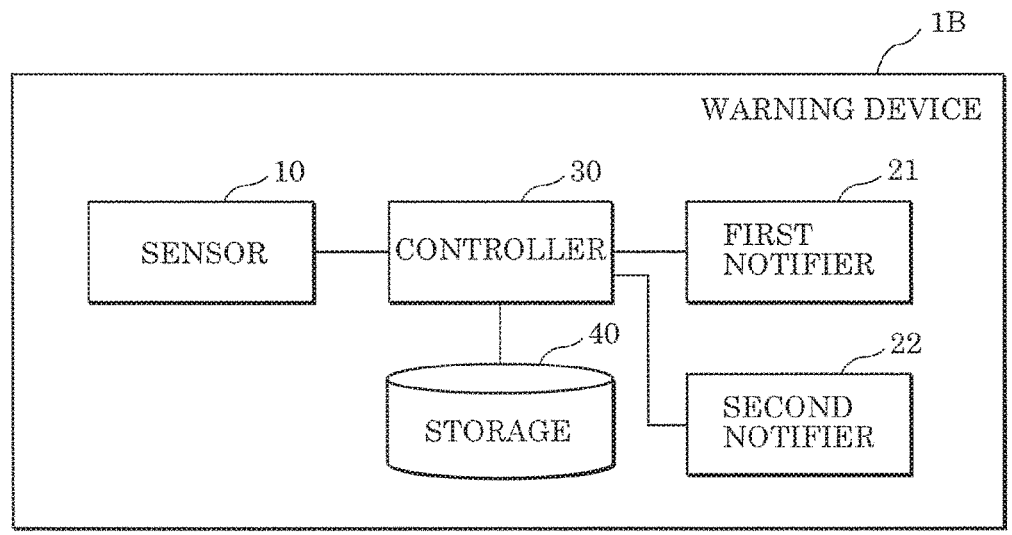
FIG. 12 is a function block diagram which illustrates a configuration of the warning device according to Modification 2.

In addition, although the warning device according to each of the above-described embodiments includes one notifier 20, the total number of notifier 20 is not limited to this example, and the warning device may include a plurality of notifiers 20. In this case, the plurality of notifiers 20 may perform notification according to different predetermined outputs, or may perform notification according to the same predetermined output. For example, warning device 1B illustrated in FIG. 12 includes first notifier 21 which performs notification by outputting light, and second notifier 22 which gives a notification by outputting a sound. It should be noted that first notifier 21 and second notifier 22 may be provided commonly among two moving objects, or may be provided in a one-to-one correspondence with two moving objects. When a plurality of notifiers 20 are provided, a notification may be performed in combination of light, a sound, an aroma, and an image that will be described later.

Figure 13:
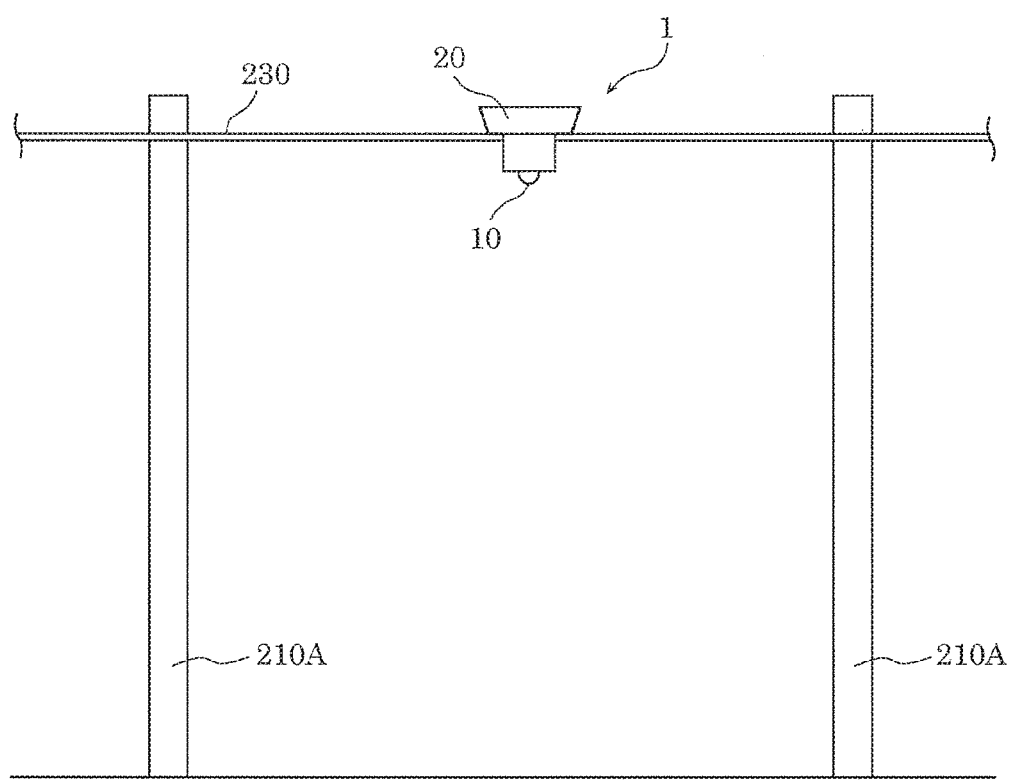
FIG. 13 is a diagram which illustrates another installation example of the warning device according to Embodiment 1.

In addition, in the above-described Embodiment 1, although warning device 1 is attached to a supporting member such as support column 210 of street light 200, the present disclosure is not limited to this example. For example, as illustrated in FIG. 13, warning device 1 may be fixed to wire 230 which is suspended using support column 210A that is the supporting member. Wire 230 is fixed to support column 210A. In this case, warning device 1 may be supplied with power from wire 230.

In addition, in each of the above-described embodiments, although the supporting member (support column 210) to which sensor 10 can be attached is fixed to the ground surface in a state in which a portion of the supporting member is embedded in the ground, the present disclosure is not limited to this example. For example, the supporting member may be fixed to a building.

In addition, in each of the above-described embodiments, although notifier 20 performs notification such that monochromatic light is emitted to a road surface (ground surface) of road 100, the present disclosure is not limited to this example. For example, notifier 20 may have an image display function in a form of a projector or the like, and may perform notification by projecting an image onto the road surface (ground surface) of road 100, a wall, or a signboard. In this case, notifier 20 may project an image including a character for calling attention, or may project an image including an illustration, a picture, etc., for calling attention. The projected image may be a still image or a moving image. In this manner, it is possible, by performing notification using an image, to cause a pedestrian or a driver of a two-wheel vehicle to more easily be aware that one of two moving objects is approaching to the other. In particular, a pedestrian who operates or watches a smartphone while walking is not likely to notice a notification simply using light because the pedestrian looks downward. In view of this, notification is performed by displaying an image on the ground surface, thereby enabling the pedestrian who looks downward to be easily aware that any moving object is approaching to the pedestrian. In other words, it is possible to increase the pedestrian's awareness by performing the notification on the ground surface.

In addition, in each of the above-described embodiments, although notifier 20 is attached to a supporting member together with sensor 10, the present disclosure is not limited to this example. For example, notifier 20 and a supporting member to which sensor 10 is attached may be spaced apart. Notifier 20 obtains a signal for performing the predetermined notification using light, via a communicator through radio communications. In this manner, even when notifier 20 is spaced apart from sensor 10, it is possible to perform desired notification by notifier 20 using radio communications. In addition, when notifier 20 is spaced apart from sensor 10, notifier 20 may be disposed closer to a moving object than a supporting member. In this manner, it is possible to perform notification to a moving object ahead of time. Accordingly, it is possible to cause two moving objects to be aware earlier that one of the two moving objects is approaching to the other.

It should be noted that the present disclosure also includes other forms in which various modifications apparent to those skilled in the art are applied to the embodiments or forms in which structural components and functions in the embodiments are arbitrarily combined within the scope of the present disclosure.

Furthermore, in each of the above-described embodiments, processing functions of controller 30, etc., may be configured in the form of an exclusive hardware product, or may be realized by executing a software program suitable for each of the structural components. Each of the structural components may be realized by means of a program executor, such as a CPU and a processor, reading and executing the software program recorded on a recording medium such as a hard disk or a semiconductor memory. In addition, processing functions of controller 30, etc., may be implemented by hardware such as a circuit. In this case, the circuit may be a general-purpose circuit or a dedicated circuit.

Furthermore, the present disclosure may be implemented as a method of controlling a warning device, or may be implemented as a program for causing a computer to execute a method of controlling a warning device. In this case, a program for executing a process of each step of the method of controlling a warning device may be recorded on a non-transitory computer readable recording medium such as a CD-ROM. In this case, a computer reads a program from the non-transitory recording medium, and executes the program, thereby executing the process of each step.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A warning device, comprising:
a sensor which is attachable to a supporting member and measures a distance, the supporting member being fixedly installed; and
a notifier which performs notification using predetermined output, wherein:
the sensor measures at least one of sensor-object distances and a moving object distance, the sensor-object distances being distances between the sensor and each of at least two moving objects which are approaching to each other, the moving object distance being a distance between the at least two moving objects which are approaching to each other,
the notifier performs the notification by varying a manner of the predetermined output according to the at least one of the sensor-object distances and the moving object distance which are measured by the sensor,
the at least two moving objects include a short-distance object and a long-distance object, the short-distance object being located at a position closer to the sensor than the long-distance object,
the sensor further detects an acceleration of the long-distance object,
the notifier further varies the manner of the predetermined output when the sensor detect an abrupt acceleration of the long-distance object,
the supporting member is fixed in a state in which a portion of the supporting member is embedded in a ground, and
the long-distance object and the short-distance object are moving in a same direction.

2. The warning device according to claim 1, wherein the notifier performs the notification according to a variation in the at least one of the sensor-object distances and the moving object distance.

3. The warning device according to claim 1, wherein the notifier varies the manner of the predetermined output according to a variation in the at least one of the sensor-object distances and the moving object distance.

4. The warning device according to claim 1, the notifier performs the notification when the long-distance object approached to the short-distance object.

5. The warning device according to claim 1, wherein the notifier and the supporting member are spaced apart from each other, and
the notifier obtains, through radio communications, a signal for performing the notification.

6. The warning device according to claim 1, wherein information related to the notification performed by the notifier is transmitted to a device other than the warning device.

7. The warning device according to claim 1, wherein the notifier includes a light source, and
the predetermined output is light of the light source.

8. The warning device according to claim 7, wherein the predetermined output is optical output, and the notifier emits light onto a ground surface, as the notification.

9. The warning device according to claim 7, wherein the notifier performs the notification by varying at least one of a brightness level of the light, a color of the light, blinking or flash of the light and distribution of the light.

10. The warning device according to claim 1, wherein the notifier and the sensor are integrated.

11. The warning device according to claim 1, wherein the notifier comprises a plurality of notifiers, and the predetermined output differs for each of the plurality of notifiers.

12. The warning device according to claim 1, wherein the warning device is supplied with power via the supporting member.

13. The warning device according to claim 1, wherein the notifier is fixed to a wire suspended using the supporting member.

14. The warning device according to claim 1, wherein the supporting member is fixed to a building.

15. The warning device according to claim 1, wherein the supporting member is a support column which has a pillar shape and is fixed to a street, and
a lighting device for illuminating the street is attached to the supporting member.

16. A notification system, comprising:
the warning device of claim 1; and
a supporting member,
wherein the supporting member is fixed in a state in which a portion of the supporting member is embedded in a ground.

17. A warning device, comprising:
a sensor which is attachable to a supporting member and measures a distance, the supporting member being fixedly installed; and
a notifier which performs notification using predetermined output, wherein:
the sensor measures at least one of sensor-object distances and a moving object distance, the sensor-object distances being distances between the sensor and each of at least two moving objects which are approaching to each other, the moving object distance being a distance between the at least two moving objects which are approaching to each other,
the notifier performs the notification by varying a manner of the predetermined output according to the at least one of the sensor-object distances and the moving object distance which are measured by the sensor, and
the notifier avoids performing of the notification when the at least two moving objects include three or more moving objects.

18. A street light system, comprising:
a plurality of street lights installed along a street; and
a plurality of warning devices attached to the plurality of street lights,
wherein each of the plurality of warning devices includes:
a sensor which measures a distance to an object; and
a notifier which performs notification using predetermined output,
the sensor measures at least one of sensor-object distances and a moving object distance, the sensor-object distances being distances between the sensor and each of at least two moving objects which are approaching to each other, the moving object distance being a distance between the at least two moving objects which are approaching to each other,
the notifier performs the notification by varying a manner of the predetermined output according to the at least one of the sensor-object distances and the moving object distance which are measured by the sensor,
the at least two moving objects include a short-distance object and a long-distance object, the short-distance object being located at a position closer to the sensor than the long-distance object, the sensor further detects an acceleration of the long-distance object, the notifier further varies the manner of the predetermined output when the sensor detect an abrupt acceleration of the long-distance object, and the long-distance object and the short-distance object are moving in a same direction.

19. The street light system according to claim 18, further comprising a management device which manages the plurality of warning devices, wherein the management device obtains information related to the notification performed by the notifier of each of the plurality of warning devices.

20. A warning device, comprising:

a sensor which is attachable to a supporting member, the supporting member being fixedly installed; and a notifier which performs notification using predetermined output, wherein:

the sensor detects a short-distance object and a long-distance object, the short-distance object being located at a position closer to the sensor than the long-distance object, the sensor detects an acceleration of the long-distance object, and detects moving directions of the short-distance object and the long-distance object, and when the moving directions are the same and the acceleration exceeds a threshold, the notifier performs the notification by varying a manner of the predetermined output, and the supporting member is fixed in a state in which a portion of the supporting member is embedded in a ground.

* * * * *